S. N. CANFIELD.
WHEEL GUARD.
APPLICATION FILED FEB. 5, 1917.
1,279,982.
Patented Sept. 24, 1918.
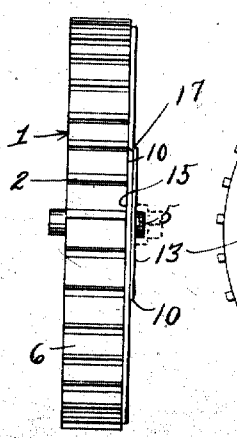
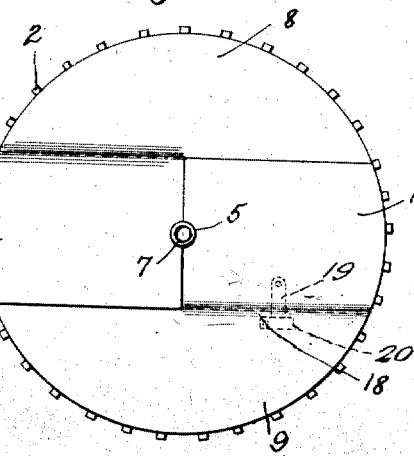
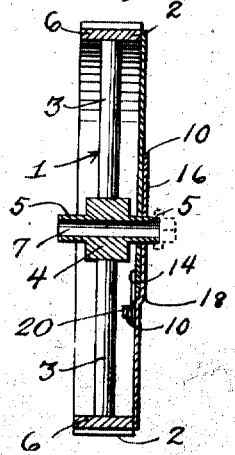
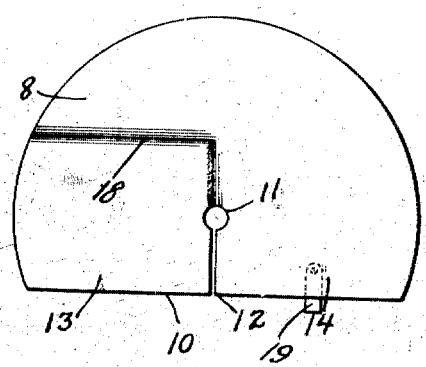
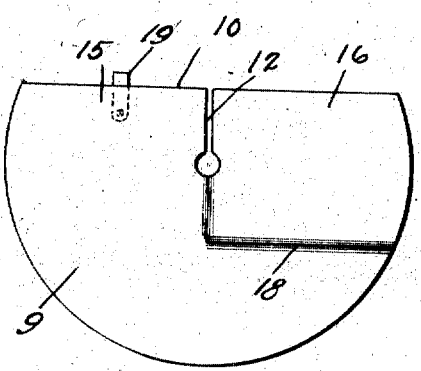
WITNESSES
Arthur K. Moore
Frank D. O'Connell
INVENTOR
Stephen N. Canfield
BY Richard Owen.
ATTORNEY

UNITED STATES PATENT OFFICE.

STEPHEN N. CANFIELD, OF HOLLY, COLORADO.

WHEEL-GUARD.

1,279,982.   Specification of Letters Patent.   Patented Sept. 24, 1918.

Application filed February 5, 1917. Serial No. 146,758.

*To all whom it may concern:*

Be it known that I, STEPHEN N. CANFIELD, a citizen of the United States, residing at Holly, in the county of Prowers and State of Colorado, have invented certain new and useful Improvements in Wheel-Guards, of which the following is a specification.

This invention relates to wheels, and more especially it is a guard intended for application to either the outside or inside of a wheel such as is usually employed upon hay rakes and other agricultural machines, the purpose being to prevent the hay from becoming entangled with the spokes of the wheel or wound about the axle during the use and operation of the machine.

Sometimes these wheels are quite large, and to cut a guard or shield in one piece from sheet metal would involve considerable expense because extra wide sheet metal would have to be used. Again it often occurs that these are the driving wheels of the agricultural machine, and it is not desired to remove them from the axles on which they are fastened; and it becomes desirable that the guards or shields applied to the inner sides of these wheels can be put on without removing the wheels themselves.

Having these considerations in mind, my invention consists broadly in making the guard or shield in two parts or sections, each therefore possible of formation from stock sheet metal narrower in width than the whole; and the invention consists specifically in the manner of forming these parts and applying them to the wheel and connecting them with each other.

A further object is to provide a shield formed of overlapped separate sections which may be applied to the wheel of the hay rake or other machine in such manner that the lapped edges will be prevented from engaging or catching hold of the hay or grass and drawing it on to the axle of the wheel during the operation of the machine.

With the above and other objects in view which will be more fully referred to in the specification, my invention consists in certain novel features of construction, combination and arrangement of parts, as will be hereinafter more fully described and pointed out.

In the accompanying drawings:

Figure 1 is an edge view of a wheel, illustrating the application of my improved shield or guard thereto, Fig. 2 is a view in side elevation, clearly portraying the arrangement of the overlapped end of the sections, Fig. 3 is a central vertical sectional view.

Fig. 4 is a view of one plate or section, and

Fig. 5 is a view of the other plate or section.

Referring now more particularly to the drawings, 1 indicates a wheel of the usual configuration of those adapted for use in connection with agricultural machines and which are generally provided with peripheral horizontally extending teeth or abutments 2 as shown. The spokes 3 are supported from the hub 4 which has tubular extensions or flanges 5 extending laterally on both sides of the hub 4 and beyond the rim 6 of the wheel. The hub 4 and extensions 5 have a bore 7 extending therethrough into which the axle of the agricultural machine is adapted to be received.

The shield or guard which forms the subject matter of my invention is made up of separate plates or sections 8 and 9. Each of these plates is formed as a round sheet metal disk with perhaps one third its area in the shape of a segment removed therefrom to provide an abrupt edge or cord 10 extending transversely of the disk and in proximity to the center opening 11 thereof and in this way larger plates can be formed from a single sheet of metal than would be possible if the entire shield were made in one piece. The chords 10 of the respective disk-sections are each slotted as indicated at 12, the slots extending radially into the center openings 11, thus dividing the chords 10 and providing each disk with two separate edge-portions. The plate 8 is divided by the slot into separate edge-portions 13 and 14, while the plate 9 is in like manner divided into edge portions 15 and 16. The edge-portion 13 of plate 8 and edge-portion 16 of plate 9 are each bent or deflected from the disk body to a plane slightly out of the plane of the disk itself, to accommodate the edges 15 or 14 as the case may be, of the adjacent disk, as illustrated more clearly in Fig. 3 of the drawings.

In assembling the parts the plates 8 and 9 are brought together until the slot of one plate is in alinement with the slot of the other plate, after which they are moved toward each other until the central openings 11 are brought into alinement with each other and form a center opening common to both plates. The assembled plates are then placed in position against the wheel 1, so that the flange 5 of the hub extends loosely through the center 11. When thus adjusted, the portion 13 of the plate 8 over-laps the portion 15 of plate 9, while the portion 16 of plate 9 over-laps the portion 14 of the plate 8. The assembled plates contact with and rest against the rim of the wheel and completely cover the space between the hub flange and the wheel rim so that not only the hub of the wheel but also the spokes are shielded and no wisps of hay, grass or other matter can be blown by the wind or become otherwise entangled with the wheel so as to interfere with the proper and efficient operation of the machine.

From what has been previously said it can readily be seen that each plate constituting a part of the guard or shield is loosely mounted upon the hub of a wheel so that the latter is revoluble therethrough without transmitting any rotary motion to the guard itself. However, should it be found expedient to so fasten the guard to the wheel as to render it revoluble with the latter, any suitable means can be resorted to for securely fastening the separate plates to each other and to the wheel so as to provide a uniform rotary movement of the shielding sections. In the present instance, this is accomplished by providing upon the inner face of each of the sections 8 and 9 a latch bolt 19 and a spring clamp 20. The bolt 19 is pivoted to the portions 14 and 15 respectively of each section and is adapted to slide under the catch or clamp 20, which is always opposite the bolt, when the sections are placed together, being for this purpose located rearwardly of the shoulder 18, as shown. The catch 20 is of the usual lip and hump formation and securely retains the bolt when the latter is slipped into engagement therewith. To prevent the sections thus joined from slipping off the flange 5, the latter may be threaded to receive the usual hub cap as indicated by dotted lines in Figs. 1 and 3 of the drawings. And when thus adapted to rotate in the direction the machine is traveling, it is to be particularly noted that the assembled plates 8 and 9 present no obstructions or interstices onto or in which the waving strands of hay or grass may be caught, since any possible crevices which may be formed between the overlapped sections of the two plates are made, by the position and arrangement of the plates, to open in a direction opposite to the direction of rotation taken by that portion of the plate in which the particular crevice or crevices may be located. In applying the shield to wheels not provided with hub extensions as illustrated in the accompanying drawings, the plates may be just as readily supported upon the axle of the machine and the marginal edges of the plates lodged under the inner periphery of the wheel rim.

Although the foregoing description illustrates what might be termed as preferred embodiment of the invention, it is to be understood that various changes in the form, proportion, and minor details of the construction, may be resorted to within the scope of the claims without in any way sacrificing any of the advantages thereof.

Having fully described my invention what I claim as new and desire to secure by Letters Patent is:—

1. A wheel guard consisting of mating sheet metal sections whereof each comprises the major part of a circle and is slotted from its chord to an opening at the center of said circle, the portions on opposite sides of the slot being deflected out of line with each other, and means for connecting said sections when assembled with their openings registering.

2. A wheel guard consisting of mating sheet metal sections whereof each comprises the major part of a circle and includes a chord slotted radially to an opening at the center of said circle, that portion to one side of the slot being deflected out of the plane of the remainder of the section, for the purpose set forth.

In testimony whereof I affix my signature in presence of two witnesses.

STEPHEN N. CANFIELD.

Witnesses:
C. A. PINKHAM,
J. L. ROBINSON.